United States Patent [19]

Pansini

[11] 4,247,216
[45] Jan. 27, 1981

[54] QUICK CONNECT HANDLE FOR SWIMMING POOL CLEANING TOOLS

[76] Inventor: Andrew L. Pansini, 200 Golden Gate Ave., Belvedere, Calif. 94920

[21] Appl. No.: 68,645

[22] Filed: Aug. 22, 1979

[51] Int. Cl.³ .................. F16D 1/10; F16B 7/10; A43B 5/02

[52] U.S. Cl. .................. 403/109; 403/322; 403/324; 403/329; 15/144 B; 15/145

[58] Field of Search .............. 403/108, 109, 329, 324, 403/322; 15/144 B, 145

[56] References Cited

U.S. PATENT DOCUMENTS

| 2,124,842 | 7/1938 | Zierold et al. | 403/109 X |
| 2,779,561 | 1/1957 | Blundeau | 403/108 X |
| 3,947,140 | 3/1976 | Thomas | 403/108 |
| 4,085,763 | 4/1978 | Thomas | 403/109 X |

FOREIGN PATENT DOCUMENTS

| 900664 | 10/1944 | France | 403/329 |
| 208870 | 11/1966 | Sweden | 15/144 B |
| 361641 | 6/1962 | Switzerland | 15/145 |
| 590855 | 7/1947 | United Kingdom | 15/144 B |

Primary Examiner—James Kee Chi

[57] ABSTRACT

A tool handle is fitted with a spring member having thumb buttons extending through one set of handle apertures and locking buttons extending through another set of handle apertures, and a pool pole is connected to the handle by being fitted within the handle and provided with a set of apertures through which the locking buttons also extend.

2 Claims, 5 Drawing Figures

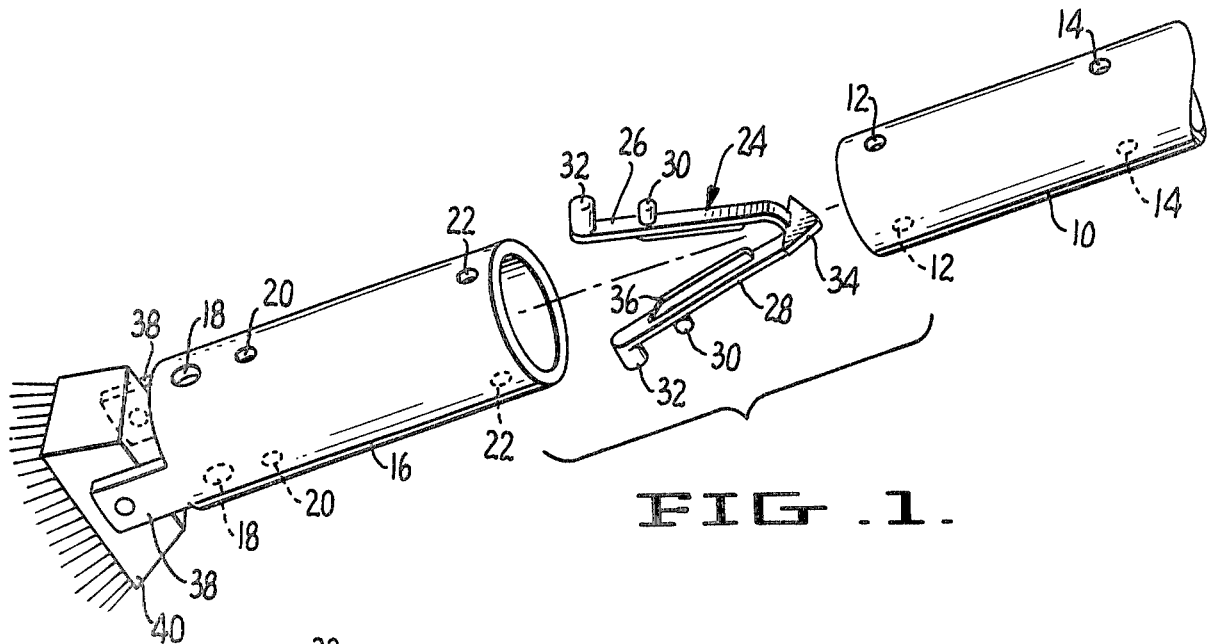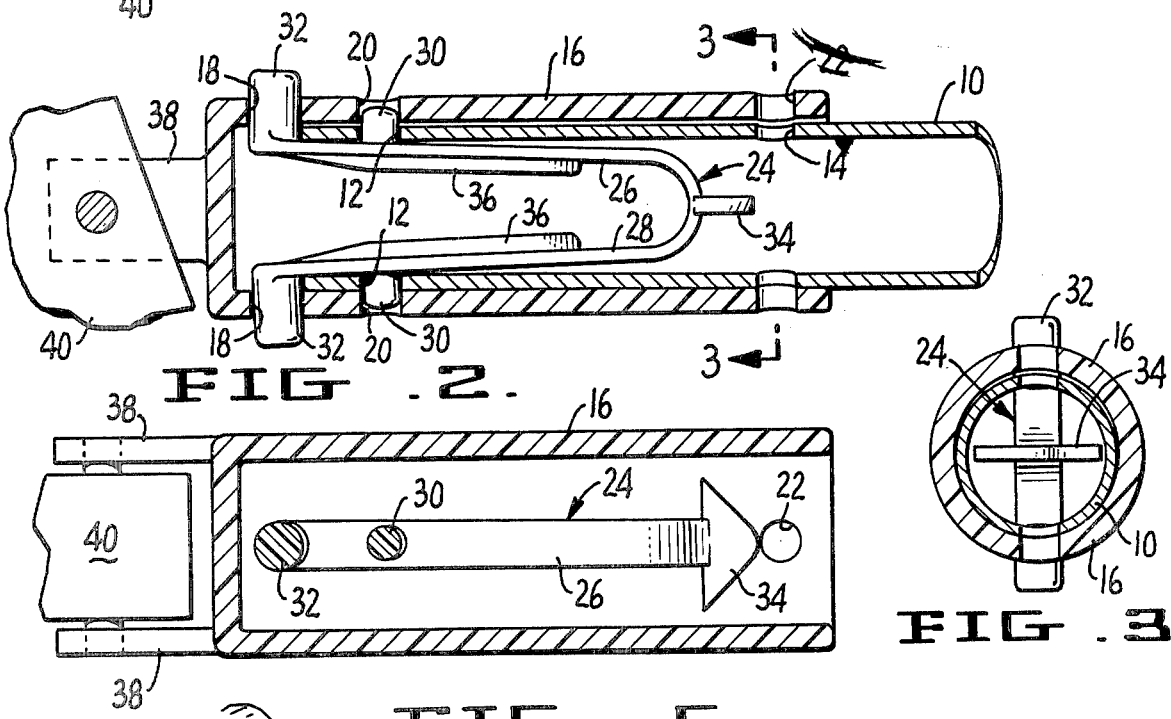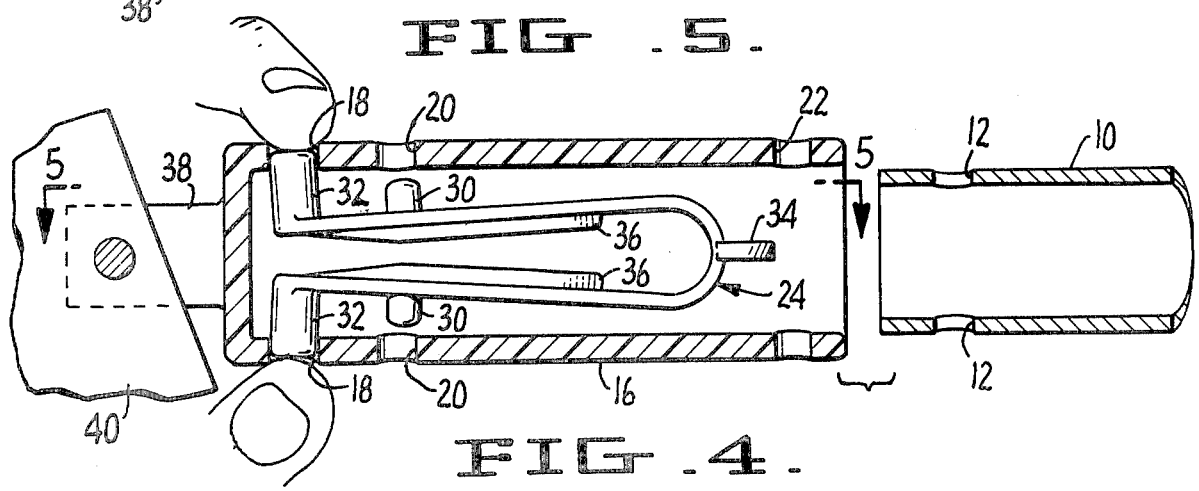

QUICK CONNECT HANDLE FOR SWIMMING POOL CLEANING TOOLS

BACKGROUND OF THE INVENTION

The invention relates to the provision of means whereby a pair of telescoping tubular members may be quickly connected against movement apart and quickly disconnected for removal apart.

It is old in this art to connect a tubular tool connector, or handle, to a tubular pool pole by providing the former with a pair of opposed spring-urged locking buttons which fit within opposed apertures in a pool pole to releaseably connect the handle and pole together.

It is also old in this art to mount the button-carrying spring member within the inner telescoped tubular member and to provide the spring member with operating thumb buttons which extend through a second set of apertures in the inner member, i.e. the pool pole.

SUMMARY OF THE INVENTION

The present invention differs from the above-described prior art in that the spring member carrying the locking buttons and thumb buttons is carried by the outer, or handle member so that conventional domestic pool poles may be used. The handle member is further provided with a pair of locking button apertures adjacent its free end. This enables the handle member, upon removal therefrom of the button-carrying spring member, to be used with foreign pool poles which carry such spring members.

THE DRAWING

FIG. 1 is a view in perspective of the elements of the subject invention in separated condition.

FIG. 2 is a view in longitudinal section of the elements of the invention in connected relation.

FIG. 3 is a view taken along lines 3—3 of FIG. 2.

FIG. 4 is a view in longitudinal section showing the elements of the invention in separated condition.

FIG. 5 is a view taken along lines 5—5 of FIG. 4.

DESCRIPTION OF PREFERRED EMBODIMENT

With reference to the drawing, the connector comprises pool pole 10 which is provided with pairs of apertures 12 and 14, tool handle 16 which is provided with pairs of apertures 18, 20 and 22, and a spring member indicated generally at 24. The member 24 is unitary and wishbone-shaped in form comprising arms 26 and 28, locking buttons 30 and thumb buttons 32. The member 24 is preferably formed of a tough, flexible plastic such as DELRIN. It is provided with a reinforcement-gripping tab and pole guide 34 and with reinforcement ribs for the arms 24 and 28. The handle 16 is provided with a pair of arms 38 whereby the handle may be attached to, for example, a brush 40.

The member 24 is normally attached to the handle so that the thumb buttons 32 extend through the apertures 18 and the locking buttons 30 extend through the apertures 20. This is accomplished by pressing the arms 26 and 28 against each other, sliding the compressed member into the handle 16, and rotating the member by twisting the tab 34 to permit the thumb buttons 32 and the locking buttons 30 to snap into their respective apertures 18 and 20. The pole 10 is then attached to the handle by depressing the thumb buttons 32, as shown in FIG. 4, and sliding the pole 10 into the handle 16 to align the apertures 12 and 20, followed by release of the thumb buttons to cause the locking buttons 30 to extend through the pole apertures 12 and into the handle apertures 20. The pole 10 is now locked to the handle 16. Disconnection of the pole and handle is effected by depressing the thumb buttons 32, as shown in FIG. 4, and by withdrawing the pole from the handle.

Pool poles in this country are normally provided with the two pairs of apertures 12 and 14. The placement of the spring member 24 within the handle 16 renders the latter particularly adaptable for use with the conventional domestic pool pole, as above-described.

As previously pointed out, some foreign pool poles, as for example in Australia, have the member 24 installed with the tab 34 adjacent the distal end of the pool pole, with the locking buttons 30 connected to a pair of apertures corresponding to apertures 14, and with the thumb buttons 32 connected into apertures like apertures 18 which are formed to the right of apertures 14, with reference to FIG. 1.

The spring member-containing handle 16 is readily adaptable for use with such a spring member-containing pool pole by removing the spring member 24 from the handle 16 and discarding it and by connecting the pole to the handle so that the locking buttons extend through the pole apertures 14 and through the apertures 22 of the handle.

What is claimed is:

1. A tool handle adapted to telescope over the end of a pool pole, said handle having adjacent its distal end a pair of diametrally opposed first apertures, and having adjacent thereto and aligned therewith a pair of diametrally opposed second apertures, and a wishbone-like spring member positioned within said handle by a pair of outer opposed thumb buttons carried thereby and extending into said first apertures and by a pair of inner opposed locking buttons carried thereby and extending into said second apertures, said thumb buttons being greater in axial length than said locking buttons whereby a conjoint but partial depressing of said thumb buttons frees said locking buttons from said second apertures while said thumb buttons still extend into said first apertures, said spring member being freeable for removal from said handle by a conjoint and substantially full depressing of said thumb buttons to free the same from said first apertures, said handle being attachable to said pool pole by means comprising a pair of diametrally opposed third apertures formed in said pole adjacent the distal end thereof and by said locking buttons which are adapted to extend through said third apertures and into said second apertures.

2. The tool handle of claim 1, said handle having adjacent its proximal end a pair of diametrally opposed fourth apertures corresponding in size to said second apertures.

* * * * *